Patented July 2, 1929.

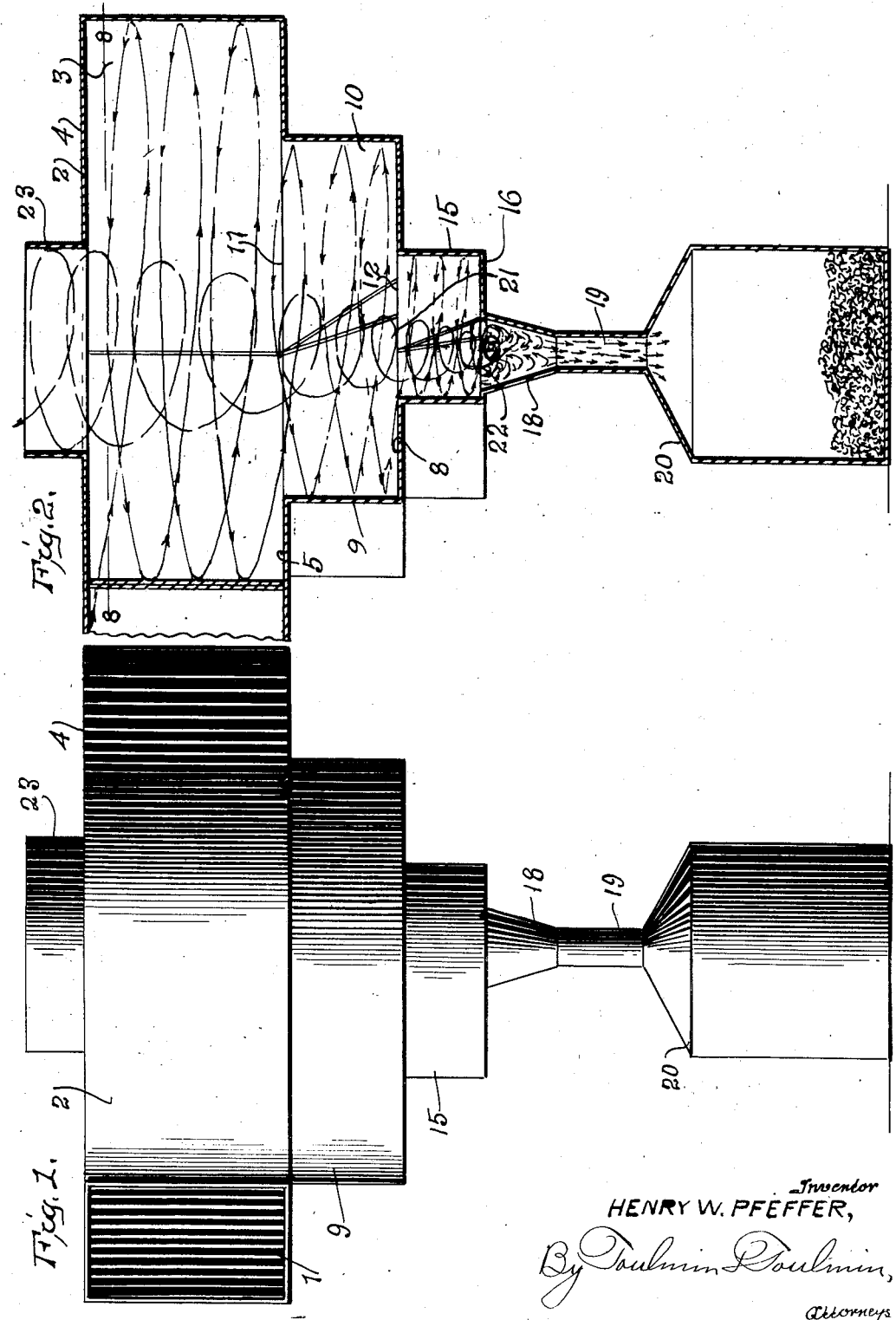

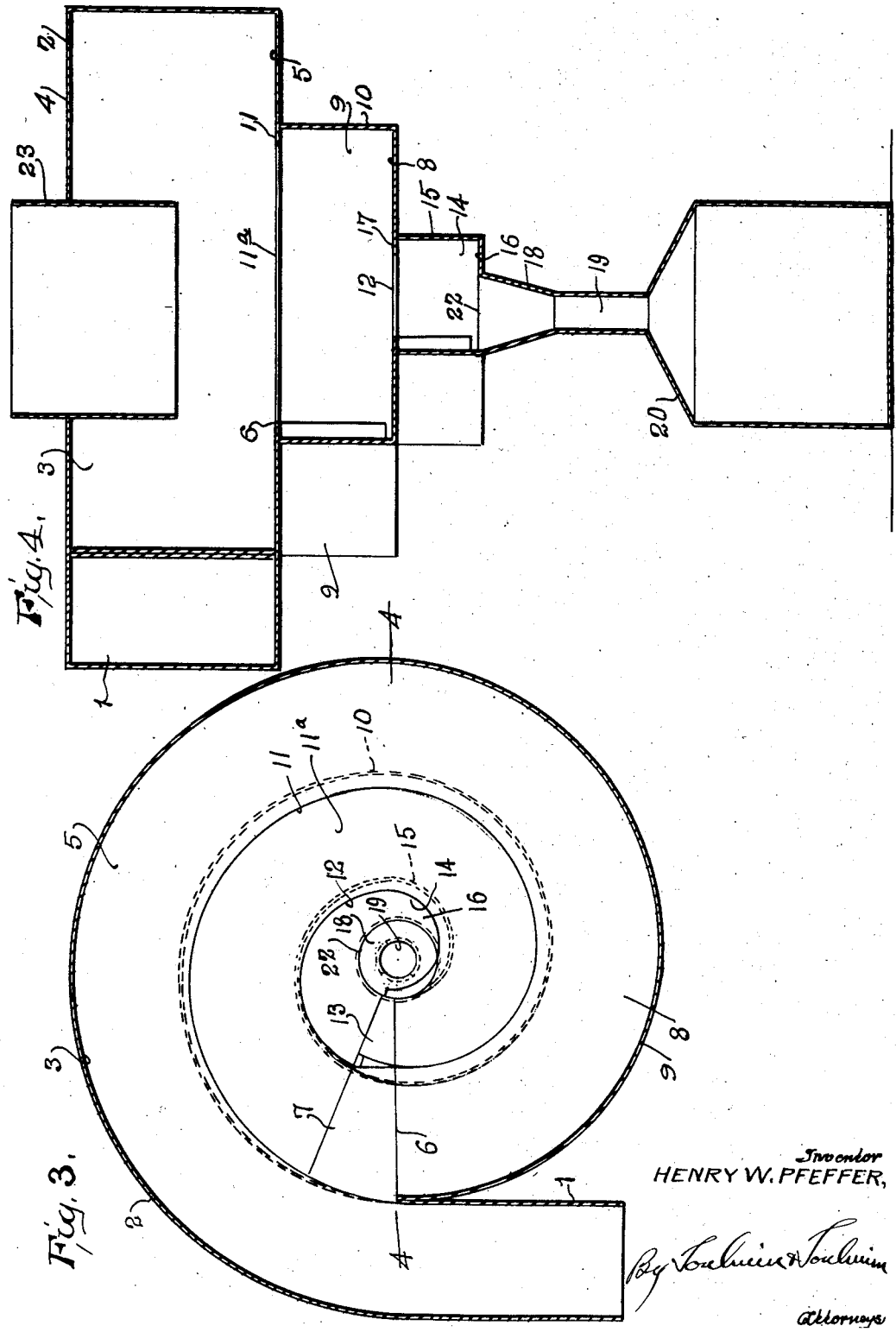

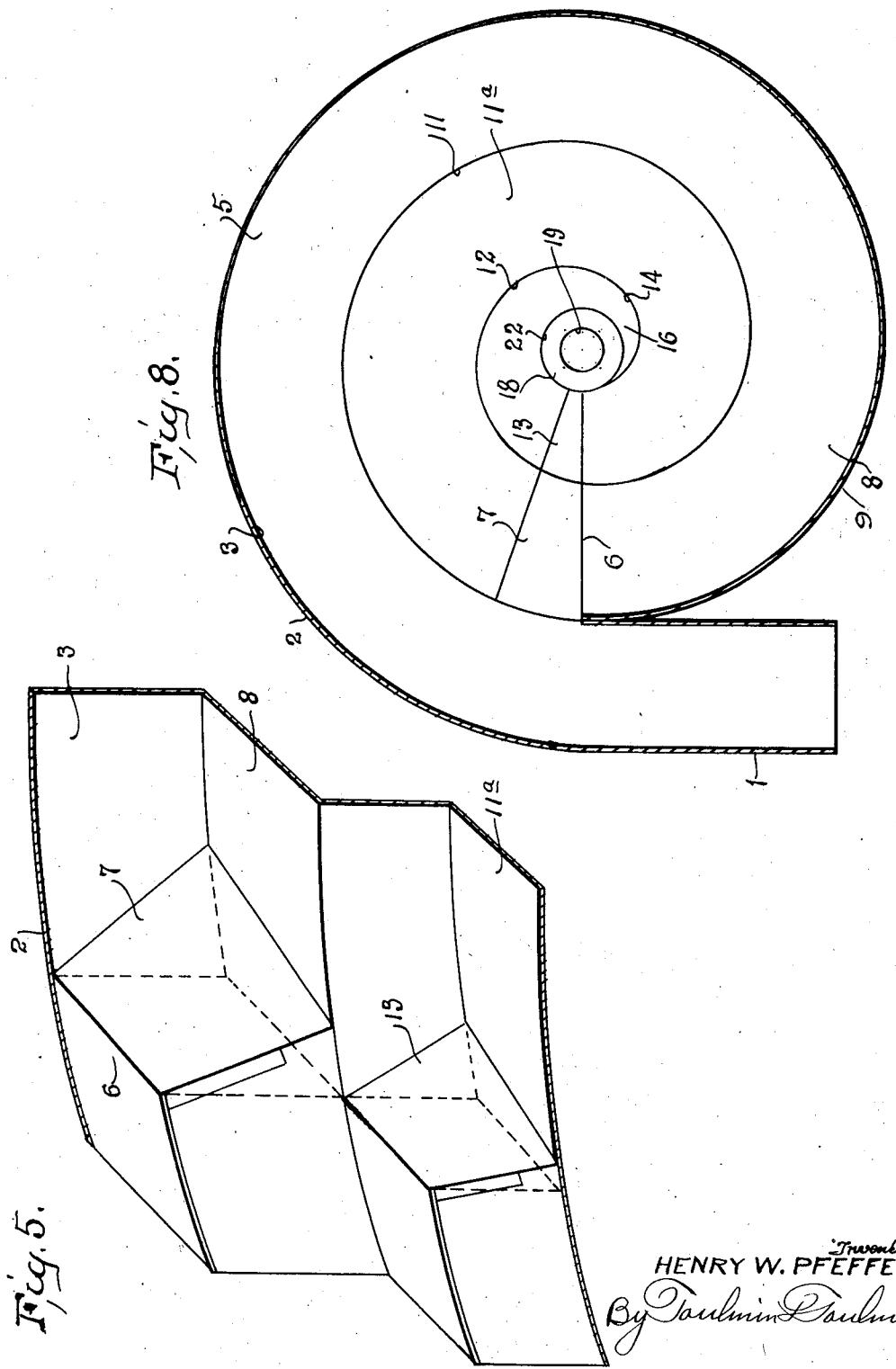

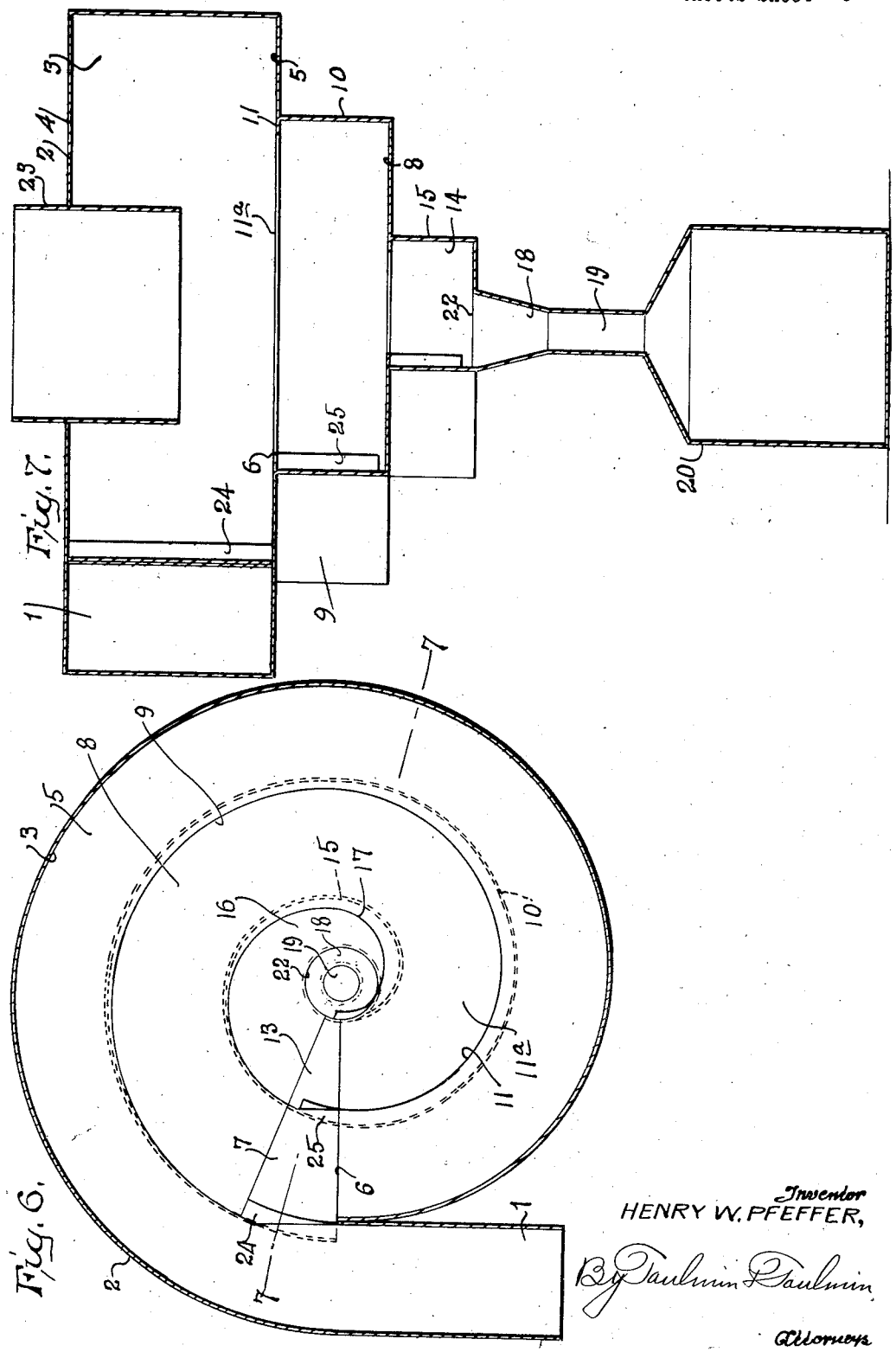

1,719,447

UNITED STATES PATENT OFFICE.

HENRY W. PFEFFER, OF NARBERTH, PENNSYLVANIA, ASSIGNOR, BY MESNE ASSIGN-
MENTS, TO AMERICAN BLOWER CORPORATION, OF DETROIT, MICHIGAN, A COR-
PORATION OF DELAWARE.

DUST COLLECTOR.

Application filed October 5, 1926. Serial No. 139,731.

My invention relates to dust collectors.

It is the object of my invention to provide a dust collector which will materially reduce the size of existing dust collectors.

It is my object to provide a dust collector which will create mechanically cyclonic conditions in the entering column of gas with the dust in suspension, conveying such gas in spirals decreasing in diameter, delivering the gas with the dust in suspension into a cone and thence into a sealed chamber, where the dust is precipitated and deposited, while the gas or air makes its exit upwardly through the center of the incoming gas or air.

It is my further object to provide a dust collector of the minimum of size, utilizing the minimum of power, in which cyclonic action is mechanically produced, so that the dust particles are thrown out against the walls of spirals decreasing in diameter and moved along platforms or surfaces at the base of each spiral and from spiral to spiral, finally terminating in a cone, whence the dust is precipitated in a closed chamber, while the air free from dust rises through the center of the collector, the dust being precipitated in the closed chamber by continuing in its original direction of movement at the time the air reverses its direction of movement to make its exit, the air making its exit being of such pressure that it is unable to lift the dust which has been thrown down into the collecting chamber.

It is my further object to create a state of vacuum in said collecting chamber.

It is my additional object to provide in some types of installations a multiscroll collector having projecting lips to prevent the particles of solid matter from riding up above the walls of each scroll sheet which goes to make up the spiral chamber.

It is a further object to include in some types of installations in such combination guide vanes, which serve to direct the particles of solid matter downwardly into the scroll and into the cone below the last vane.

It is the object of my invention to eliminate substantially or reduce to the minimum changes in direction, cross currents and internal turbulence in the collector in order to decrease the resistance to the flow of air or gas through the collector, thereby decreasing the amount of power necessary to operate this collector.

It is my further object to provide an arrangement to secure cyclonic action with the minimum of dependence upon the velocity of the air or gas passing through the collector.

It is my further object to provide a collector in which the solid matter will remain in contact with the periphery of the collector for a shorter period and thereby reduce the period of abrasive action.

It is my further object of so arranging the collector that the ascending spiral of air tends to crowd out or strip the spirally moved column of air of a portion of its volume in each scroll, this stripped portion joining the upwardly whirling column of air. In my collector, there is no turbulence or cross currents.

Referring to the drawings:—

Figure 1 is a side elevation of the collector;

Figure 2 is a diagrammatic view of the collector showing the passage of the air and dust into the collector and the exit of the air from the collector;

Figure 3 is a top plan view of the collector with the upper cover removed with the lips and vanes;

Figure 4 is a section on the line 4—4 of Figure 3;

Figure 5 is a diagrammatic view of the overhanging lip and the construction for conveying the air or gas and dust from one level of spiral to the next succeeding level therebelow;

Figure 6 is a top plan view with the upper cover removed showing a modified form of the separator or collector with an enlarged lower scroll to insure greater area and to compensate for the area taken by the projecting lip and guide;

Figure 7 is a section on the line 7—7 of Figure 6, and

Figure 8 is a section on the line 8—8 of Figure 2.

My invention comprehends the use of a multi-scroll separator or collector arranged to form, through a series of successive, superimposed spirals decreasing in diameter downwardly, a spirally, inwardly-rotating column of air or gas directed downwardly and terminating in a cone which forms a base for the vortex created by the duplicating cyclonic action.

The particles of matter in suspension on entering the separator are forced to the periphery and downwardly to the cone where they, due to the whirling motion, leave the air or gas which changes its direction to upward movement and departs from the collector out the circular outlet or collar centrally located at the top of the collector.

The particles of matter on leaving this cyclone of air or gas fall through the tail piece to an air-tight receiver or sealed conveyor.

Referring to the drawings in detail, 1 is an inlet tube which delivers to the collector air or gas with material in suspension. The air or gas enters into the upper scroll 2. The centrifugal action of the cyclone, which is thereby produced and which is in its initial stages when the air is in the upper and largest scroll, throws the dust particles outwardly against the wall 3 of the upper scroll 2 beneath the cover 4.

The dust so thrown outwardly against the outer wall 3 is carried by the action of the air or gas around the scroll and to the floor thereof designated 5 until the end of the floor is reached at 6, whence it is carried downwardly over the descending platform 7, which is angularly disposed to the floor 5.

The platform 7 carries the dust and air to the next succeeding floor below, designated 8, which is the floor of the second scroll, generally designated 9, having a wall 10. The wall 10 of this scroll is overhung by a lip 11, which is a continuation of the floor 5 of the scroll next above. This lip prevents particles of solid matter in rotation from riding up out of the scroll in which said particles are then rotating, thus insuring a positive downward movement in a downward path of the particles at the periphery of the scroll, which are being whirled about by the cyclonic action of the air.

It will be understood that the floor 5 is provided with an opening 11$^a$, while the floor 8 is provided with an opening 12.

The particles of dust descend with the cyclonic air or gas from the platform 8 of the second scroll down the floor or angular chute 13 leading from the second scroll to the third scroll, designated 14.

The third scroll side wall is designated 15 and its floor is designated 16. An overhanging lip, which is a continuation of the floor 8, is provided above it, as at 17. This scroll is smaller in diameter than the next preceding scroll. The air is then passed with its load of particles which are collecting against the wall 15 into the funnel 18, whence the dust descends along the walls of this funnel or cone which forms the base of the vortex. The dust continues to descend through the tail piece or tube 19 to an air-tight receiver 20.

The air, however, having been slowed up by running into an area of greater pressure, due to the confined air in the receiver 20, and having thereby relieved itself of its load of particles, which have descended into the receiver, turns back upon itself from the area of greatest pressure in the cone or funnel and makes its exit along the line of least resistance, which is the center path, designated 21 within the cyclonic whirl of the incoming air or gas, making its exit upwardly through the center thereof through the openings 22, 12 and 11 out the exit passageway 23.

It will be noted that the path through which it makes its exit expands from the bottom to the top, thereby facilitating the exit of the air which has been unburdened of its load of dust.

In the modified form shown in Figures 6 and 7, I have provided an additional lip 24 which extends from the top 4 of the collector to the floor 5, to insure that the dust will descend the inclined platform or ramp 7.

A similar overhanging lip adjacent the ramp 13 may be provided and designated 25.

It will be understood that, while it is more convenient to manufacture a structure of this sort with a ramp angularly disposed to the floors of the adjacent scrolls, it is also possible, in some structures, to have a continuous floor gradually descending, so that the floor of one scroll will merge into the other or be a continuation thereof.

*Method of extracting solid material from air or gas.*

The trajectory of any particle of solid matter, which has greater density than that of the conveying medium, such as air or gas, through which it travels, is generally downward. The trajectory is the component of the force of the movement imparted to it in the air or gas in which it finds itself and the effect of gravity.

Utilizing this well known physical fact, I move the column of air in a volute or a downwardly descending spiral path, in which the spirals contract in diameter as they descend. Thus, the particles of greater density leave the path of travel followed by the gas or air and in proportion to the difference in density and the speed at which the column of air or gas travels, such particles are drawn downwardly or tend to follow the original line of travel. Thus, the dust, in this case, will collect against the side walls and on the floor of each spiral, and, due to the effect of gravity, the particles tend to fall downwardly descending from spiral to spiral.

By reducing the cross sectional area of succeeding spirals and shortening the circumference, the time and distance of travel of the solid matter in rotation to reach the periphery is materially reduced, and as the spiral or scroll has a constantly reducing radius which tends to speed up the column of gas or air and, at the same time, prevents the particles of matter from leaving the company of the column of air entirely, the particles are gradually borne downwardly and inwardly to the central lower cone, whence they are deposited, due to the fact that a closed container is provided, in which there is an area of greater pressure, so that the air is suddenly slowed up, depositing its load of solid matter and making its exit in the reverse direction through the center of the vortex upwardly in an expanding path, which reduces the pressure therein.

It will be understood that the vanes and lips are not essential in some types of installations.

It will be understood that I desire to comprehend within my invention such modifications as may be necessary to adapt it to varying conditions and uses.

Having thus fully described my invention, what I claim as new and desire to secure by Letters Patent, is:—

1. In a dust collector, an intake, a plurality of superimposed spiral communicating scroll chambers having horizontal bottoms, and ramps connecting them, the width of the bottoms adapted to convey the air and dust in an unbroken stream from one horizontal plane along one bottom and along the connecting ramp to another horizontal plane on the next adjacent bottom, and means communicating with the lowermost of said chambers for collecting dust therein, and an exit at the top of the uppermost scroll for the exit of air free from dust.

2. A dust collector having in combination a plurality of communicating scrolls having floors and superimposed one over the other of decreasing diameter, ramps to convey solid material from the end of the floor of one scroll to the floor of another, means to collect solid material from the floor of the lowermost scroll and means to permit the exit of air from the uppermost scroll.

3. A dust collector having in combination a plurality of communicating scrolls having floors and superimposed one over the other of decreasing diameter, ramps to convey solid material from the end of the floor of one scroll to the floor of another, means to collect solid material from the floor of the lowermost scroll and means to permit the exit of air from the uppermost scroll, and a closed container connected to said collecting means.

4. In combination in a dust collector, an intake passageway communicating with a plurality of scrolls of decreasing diameter in superimposed relationship to one another having the centers thereof open and having the side walls thereof adjacent the inner margin of the floor of the scroll next above, ramps substantially the width of the scroll floors joining the floors one to the other, a cone communicating with the opening in the floor of the lowermost scroll, a closed collector connected therewith to prevent the rising of the dust and air column from the floors.

5. In combination in a dust collector, an intake passageway communicating with a plurality of scrolls of decreasing diameter in superimposed relationship to one another having the centers thereof open and having the side walls thereof adjacent the inner margin of the floor of the scroll next above, ramps substantially the width of the scroll floors joining the floors one to the other, a cone communicating with the opening in the floor of the lowermost scroll, a closed collector connected therewith, and a lip overhanging the side wall of each scroll.

6. In combination, an intake passageway, a scroll having a cover opening centrally, a floor for said scroll, a ramp leading from the end of said floor to the floor of a next succeeding scroll, a second scroll of lesser diameter having a portion of its side wall adjacent the edge of the floor of a portion of the scroll just above and another portion of its side wall adjacent the outer margin of the floor of the scroll just above, a third scroll similarly arranged, a cone connected to the floor of the third scroll communicating with an opening therein beneath an opening in the floor of the second scroll and a closed container connected therewith, said floors of the second and third scrolls being connected by a ramp.

7. In a dust collector, an intake passageway, a spiral chamber having a horizontal floor spirally arranged, said floor being located in a horizontal plane, a second spiral chamber beneath the first chamber of smaller diameter having a spiral floor in a horizontal plane, a ramp connecting the end of said floors, a third spiral chamber having a horizontal floor, a ramp connecting the floors of the second and third chambers, the third chamber being of lesser diameter than the second and the floor of the third chamber terminating at the margins of a cone, a cone united to said floor, a cover for the first chamber having an exit opening, the center of which is located over the center of said cone.

8. In a dust collector, an intake passageway, a spiral chamber having a horizontal floor spirally arranged, said floor being located in a horizontal plane, a second spiral chamber beneath the first chamber of smaller diameter having a spiral floor in a horizontal plane, a ramp connecting the end of said floors, a third spiral chamber having a horizontal floor, a ramp connecting the floors of the second and third chambers, the third chamber being of lesser diameter than the second and the floor of the third chamber terminating at the margins of a cone, a cone united to said floor, a cover for the first chamber having an exit opening, the center of which is located over the center of said cone, said centers being so located that a line drawn therebetween is eccentrically located with respect to the actual centers of each of said chambers.

9. In a method of removing solid material from air, passing air in a column containing material through a spiral path of decreasing diameter, passing the column of air into a container, depositing solid material therein and removing the air free from solid material upwardly through the spiral, said line of movement upwardly of the air being located eccentrically of the center of the spiral.

In testimony whereof, I affix my signature

HENRY W. PFEFFER.